United States Patent
Hardison et al.

(10) Patent No.: US 9,736,019 B2
(45) Date of Patent: Aug. 15, 2017

(54) METHODS FOR DYNAMIC ROUTER CONFIGURATION IN A MESH NETWORK

(71) Applicant: eero inc., San Francisco, CA (US)

(72) Inventors: Nathaniel Crane Hardison, San Francisco, CA (US); Rowan Matthew Chakoumakos, San Francisco, CA (US); Timothy Amos Schallich, San Francisco, CA (US); Nicholas Spencer Weaver, San Francisco, CA (US)

(73) Assignee: eero inc., San Francisco, CA (US)

( * ) Notice: Subject to any disclaimer, the term of this patent is extended or adjusted under 35 U.S.C. 154(b) by 0 days.

(21) Appl. No.: 15/131,472

(22) Filed: Apr. 18, 2016

(65) Prior Publication Data
US 2016/0337185 A1    Nov. 17, 2016

Related U.S. Application Data

(60) Provisional application No. 62/161,652, filed on May 14, 2015.

(51) Int. Cl.
| | |
|---|---|
| *H04L 12/24* | (2006.01) |
| *H04W 4/00* | (2009.01) |
| *H04W 84/18* | (2009.01) |
| *H04L 29/12* | (2006.01) |

(52) U.S. Cl.
CPC ...... *H04L 41/0813* (2013.01); *H04L 61/2015* (2013.01); *H04L 61/2514* (2013.01); *H04W 4/008* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,012,088 A | 1/2000 | Li et al. | |
| 6,195,705 B1* | 2/2001 | Leung | H04W 8/12 |
| | | | 370/331 |
| 7,421,266 B1* | 9/2008 | Bruestle | H04W 12/06 |
| | | | 379/161 |
| 8,041,785 B2* | 10/2011 | Mazur | H04L 41/0803 |
| | | | 709/219 |
| 8,180,835 B1* | 5/2012 | Lu | H04L 51/12 |
| | | | 709/206 |
| 8,478,849 B2* | 7/2013 | Marl | H04L 12/2807 |
| | | | 709/223 |
| 8,533,309 B1* | 9/2013 | Howarth | H04L 41/0853 |
| | | | 709/223 |
| 9,286,047 B1* | 3/2016 | Avramov | G06F 8/61 |
| 2002/0128925 A1* | 9/2002 | Angeles | G06F 11/3414 |
| | | | 705/26.1 |
| 2003/0110240 A1 | 6/2003 | Lockridge et al. | |
| 2005/0149204 A1* | 7/2005 | Manchester | H04L 29/06 |
| | | | 700/1 |
| 2006/0159029 A1 | 7/2006 | Samuels et al. | |

(Continued)

*Primary Examiner* — Ninos Donabed
(74) *Attorney, Agent, or Firm* — Jeffrey Schox; Diana Lin

(57) ABSTRACT

A method for router configuration includes: at a router, collecting DHCP server presence data of a local area network; at the router, collecting NAT server presence data of the local area network; generating a network configuration status based upon the DHCP server presence data and the NAT server presence data; and configuring DHCP server and NAT server settings of the router based on the network configuration status.

16 Claims, 10 Drawing Sheets

(56) References Cited

U.S. PATENT DOCUMENTS

| | | | |
|---|---|---|---|
| 2006/0247824 A1* | 11/2006 | Walker | G06Q 20/02 700/241 |
| 2006/0285510 A1 | 12/2006 | Kim et al. | |
| 2007/0022185 A1* | 1/2007 | Hamilton | H04L 41/085 709/220 |
| 2007/0274285 A1* | 11/2007 | Werber | H04L 41/0806 370/351 |
| 2007/0274314 A1* | 11/2007 | Werber | H04L 12/5695 370/392 |
| 2008/0019367 A1 | 1/2008 | Ito et al. | |
| 2008/0062977 A1 | 3/2008 | Kaneko et al. | |
| 2008/0075090 A1* | 3/2008 | Farricker | H04L 47/10 370/395.53 |
| 2009/0086029 A1* | 4/2009 | Wei | H04N 5/23206 348/207.1 |
| 2009/0119770 A1* | 5/2009 | Soliman | H04L 63/20 726/14 |
| 2010/0008272 A1 | 1/2010 | Messinger et al. | |
| 2010/0074225 A1* | 3/2010 | Johnston, Jr. | H04H 20/69 370/331 |
| 2010/0097982 A1* | 4/2010 | Eichenberger | H04W 36/08 370/328 |
| 2010/0188975 A1 | 7/2010 | Raleigh | |
| 2010/0257584 A1 | 10/2010 | Meenan et al. | |
| 2010/0313232 A1* | 12/2010 | Norin | H04H 20/63 725/110 |
| 2011/0007159 A1* | 1/2011 | Camp | H04N 7/183 348/143 |
| 2011/0101781 A1* | 5/2011 | Roepke | H02J 9/061 307/66 |
| 2011/0122774 A1 | 5/2011 | Hassan et al. | |
| 2011/0134798 A1 | 6/2011 | Magnuson et al. | |
| 2011/0292206 A1* | 12/2011 | Newton | H04L 12/4641 348/143 |
| 2011/0299518 A1* | 12/2011 | Chang | H04W 48/18 370/342 |
| 2011/0314129 A1* | 12/2011 | Rezaiifar | H04W 76/025 709/218 |
| 2012/0023207 A1* | 1/2012 | Gandhewar | H04L 61/2038 709/221 |
| 2012/0057456 A1* | 3/2012 | Bogatin | H04W 28/08 370/230.1 |
| 2012/0290694 A9* | 11/2012 | Marl | H04L 12/2807 709/223 |
| 2013/0091254 A1* | 4/2013 | Haddad | H04L 61/6059 709/220 |
| 2013/0173797 A1* | 7/2013 | Poirer | H04L 61/2528 709/225 |
| 2013/0182712 A1 | 7/2013 | Aguayo et al. | |
| 2013/0219082 A1 | 8/2013 | Mitomi et al. | |
| 2013/0239181 A1* | 9/2013 | Varsavsky Waisman-Diamond | H04L 29/12367 726/4 |
| 2014/0108149 A1 | 4/2014 | Jabara et al. | |
| 2014/0108627 A1* | 4/2014 | Donley | H04L 61/2015 709/222 |
| 2014/0156082 A1 | 6/2014 | Ha | |
| 2014/0162600 A1* | 6/2014 | Chang | H04W 12/06 455/411 |
| 2014/0283029 A1 | 9/2014 | Chandrasekaran et al. | |
| 2015/0141005 A1 | 5/2015 | Suryavanshi et al. | |

\* cited by examiner

Configuration data passed from router management platform
to router via cellular internet connection Configuration data passed from user electronic device
to router via Bluetooth or Wi-Fi Instructions to reconfigure ISP modem Automatic reconfiguration of ISP modem

METHODS FOR DYNAMIC ROUTER CONFIGURATION IN A MESH NETWORK

CROSS-REFERENCE TO RELATED APPLICATIONS

This application claims the benefit of U.S. Provisional Application Ser. No. 62/161,652, filed on 14 May 2015, which is incorporated in its entirety by this reference.

TECHNICAL FIELD

This invention relates generally to the computer networking field, and more specifically to new and useful methods for dynamic router configuration in a mesh network.

BACKGROUND

The modern internet has revolutionized communications by enabling computing devices to transmit large amounts of data quickly over incredibly vast differences. The rate of innovation set by application and web developers is breathtakingly fast, but unfortunately, not all aspects of the internet experience have kept pace. In particular, even as people rely more and more heavily on home networking solutions to enable internet connectivity for a rapidly increasing collection of electronic devices, the technology underpinning those solutions often provides a woefully inadequate user experience. In particular, it is often difficult for users to configure home networking solutions correctly in scenarios involving more than one networking device (e.g., routers, switches, gateways, etc.); for example, wireless mesh networks. Thus, there is a need in the computer networking field to create new and useful methods for dynamic router configuration in a mesh network.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
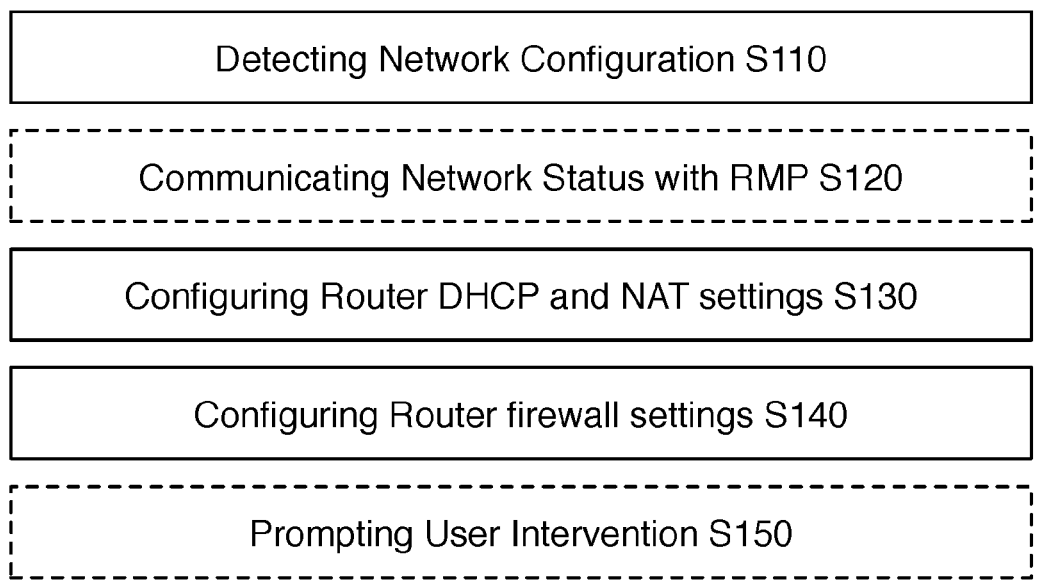
FIG. 1 is a chart representation of a method of a preferred embodiment.

A method 100 for dynamic router configuration in a mesh network includes detecting a network configuration S110 and configuring router DHCP and NAT settings S130 based on the network configuration, as shown in FIG. 1. The method 100 may additionally include communicating network status with a remote management platform S120, configuring router firewall settings S140, and/or prompting user intervention S150.

Figure 2:
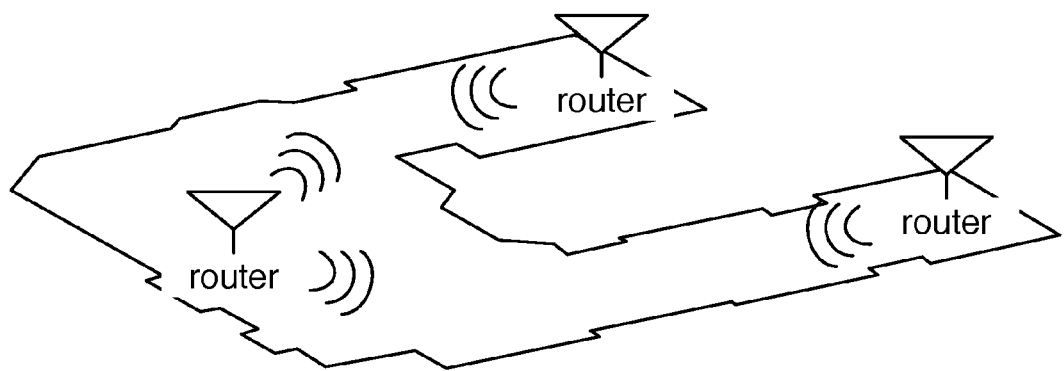
FIG. 2 is a diagram representation of a mesh network using smart routers.

The method 100 functions to enable smart routers to configure themselves to best suit a user's particular home network configuration. In particular, the method 100 preferably enables multiple smart routers to work together to create a wireless mesh network, blanketing a space in wireless network coverage, as shown in FIG. 2.

Typically, to configure an internet-connected wireless mesh network, a user must configure a first router to serve as a gateway to the internet (e.g., by connecting the router to a cable modem). Further, some networking device (generally the aforementioned first router) must also be configured to serve as a network address translation (NAT) server, a dynamic host configuration protocol (DHCP) server, and a wireless access point. Then, to extend wireless coverage as shown in FIG. 2, additional devices (e.g., wireless routers, access points, repeaters) must be added. Even in the simple case of two or three wireless access points, the configuration options are virtually endless. For example, the access points could exist on a single bridged network, or could be separated into different networks (e.g., could be assigned to different VLANs). The access points could be connected to each other by Ethernet cables, or simply serve as wireless repeaters. The access points could share available Wi-Fi channel space in any number of ways.

Even for experienced users, the array of network configurations available can be extremely overwhelming. The method 100 functions to perform much of this configuration both automatically and dynamically-optimizing the network for a user's needs without requiring extensive computer networking knowledge or hassle.

The method 100 may additionally be used to configure smart routers to address issues other than those posed by wireless mesh networking; for example, the method 100 may enable a home network to make efficient use of multiple wide area network (WAN) gateways (e.g., splitting traffic across them, using one WAN access point as backup for another, etc.).

The smart routers described herein are preferably substantially similar to those described in U.S. patent application Ser. No. 15/008,251, the entirety of which is incorporated by this reference. Additionally or alternatively, the smart routers may be any suitable networking devices.

Figure 3:
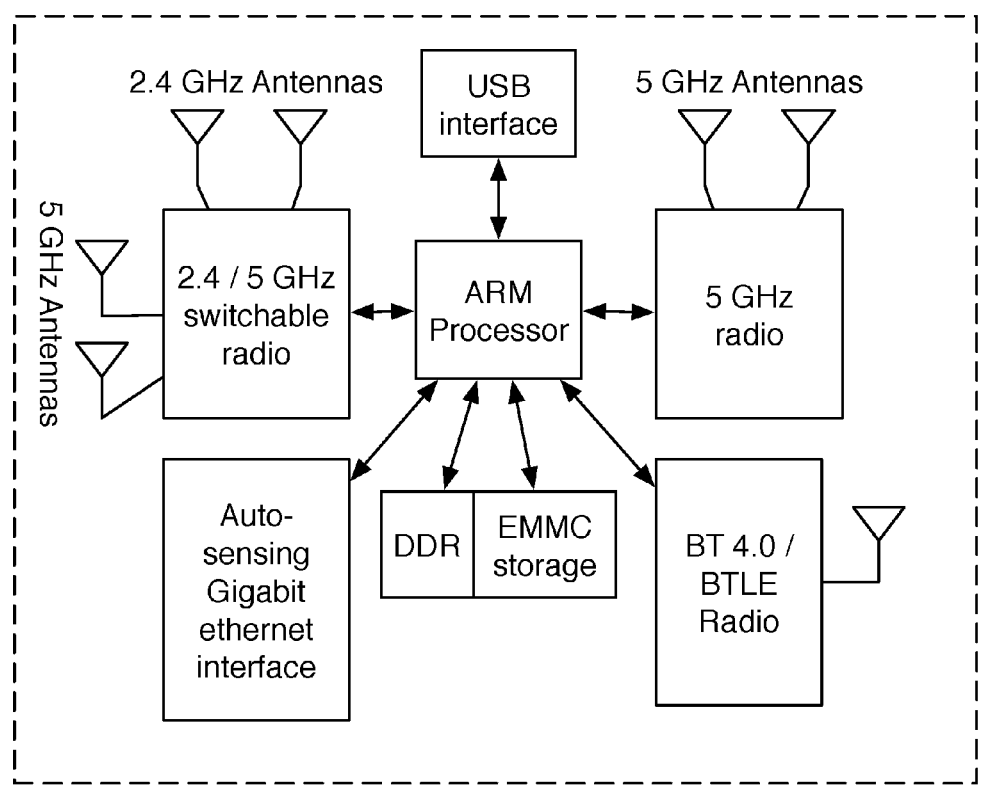
FIG. 3 is a diagram representation of a smart router.

Smart routers implementing the method 100 preferably include a Wi-Fi radio, a Bluetooth radio, an Ethernet interface, and a processor. The router may additionally or alternatively include any other hardware or software. In one example implementation, as shown in FIG. 3, a smart router includes two Wi-Fi radios: one 5 GHz radio, and one switchable radio (that may operate at either 5 or 2.4 GHz), a Bluetooth radio capable of both Bluetooth 4.0 and BTLE communication, an auto-sensing gigabit Ethernet interface, an ARM processor, DDR RAM, EMMC storage (for router firmware), and a USB interface (e.g., for adding network-accessible storage).

Smart routers operating the method 100 are preferably configured and/or managed by a remote management platform. In one example, smart routers may be configured by altering stored configuration profiles in a remote server (part of the remote management platform), after which the stored configuration profiles are pushed to the smart routers. This technique is particularly useful in mesh networking applications; if the remote management platform is aware that three smart routers are intended for use in a single network, the remote management platform can attempt to bridge the networks of the three routers regardless of physical location or existing network topology.

The method 100 is preferably performed by smart routers (either independently or cooperatively), but may additionally or alternatively be performed by any other suitable computing device. For example, as described in later sections, some steps of the method 100 may be performed by a remote management platform.

While the method 100 is described throughout this application as being applicable to home networks, a person skilled in the art will recognize that such a system can be applied to any suitable network (such as one in a small business). The method 100 is preferably intended for use in scenarios where enterprise networking solutions (and the support staff to maintain them) are not feasible; additionally or alternatively, the method 100 may be used in any suitable scenario (e.g., in typical enterprise networking scenarios).

Step S110 includes detecting a network configuration. Step S110 functions to provide a router with information about the network to which the router is connected. In particular, Step S110 preferably functions to provide the router with information about other routers on the network (useful for mesh networking) and/or information about potential gateways to the internet (useful for the router to provide connectivity to the internet).

Step S110 preferably includes detecting the path between the router and one or more internet gateways, but may additionally or alternatively include detecting any other relevant network configuration information (e.g., identity of devices on the network, presence and configuration of DHCP, NAT, and/or DNS servers, presence and configuration of firewalls, available LAN/WAN bandwidth, etc.).

Step S110 is preferably performed upon initial configuration of a router, but may additionally or alternatively be performed at any suitable time; for example, upon detection of network changes (e.g., detection of an additional router, detection of router configuration changes, detection of changes to internet connectivity, detection of decreased quality of service, detection of high latency, detection of packet loss), at the request of a network administrator or the remote management platform, or upon expiration of some time threshold (e.g., every five days). Step S110 can be performed automatically (e.g., conditioned on a particular feature or changes to a particular feature of the network), manually (e.g., when prompted by a user), or in any other suitable manner. If Step S110 is initiated manually, the user preferably has the option of doing so via any means; e.g., physically (e.g., by pushing buttons located physically at the router), remotely (e.g., by requesting it via a remote management platform, by means of an application installed on an external electronic device, etc.), etc. Performing Step S110 may also include detecting network configuration data using both automatic and manual aspects; for example, Step S110 can be initiated automatically and automatically detect network features while also (either simultaneously or sequentially) soliciting input from the user to aid in gathering network configuration data.

Figure 4:
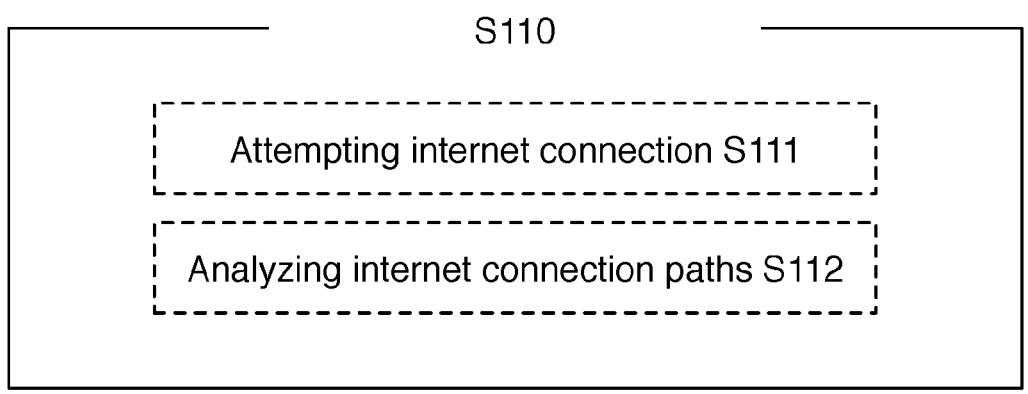
FIG. 4 is a chart representation of a network configuration detection step of a method of a preferred embodiment.

Step S110 preferably includes attempting to establish an internet connection S111 and analyzing internet connection paths S112, as shown in FIG. 4.

Step S111, attempting to establish an internet connection, functions to enable a router to determine information about a network's internet connectivity (or lack thereof). Step S111 may also function to allow a router to connect to a remote management platform to download configuration data, or to perform network analysis (e.g., as described in Step S112).

Step S111 preferably includes requesting a DHCP-assigned IP address. If a DHCP-assigned IP address is received, the IP address can be used to perform some analysis of the network path. In particular, receiving a DHCP-assigned IP address can be an indication that a DHCP server (or, possibly, multiple DHCP servers) already exists on the local area network; alternatively or additionally, receiving a DHCP-assigned IP address can indicate the presence of a pre-existing internet connection (or, possibly, multiple pre-existing internet connections), can be used to analyze the network topology between various DHCP servers and other network entities (e.g., other routers, switches, external servers, etc.) on the local area network, or can be used for any other suitable purpose. In addition to receiving a DHCP-assigned IP address, requesting a DHCP-assigned IP address may include receiving additional information that may be used to perform network path analysis; for example, the router address, DNS addresses, DHCP lease time, and/or a subnet mask associated with a DHCP lease may be received along with the DHCP-assigned IP address and may be used to perform network configuration analysis. If a DHCP-assigned IP address is not received, this may be an indication that the router is not connected to a LAN or WAN (or that a DHCP server is not running on a connected LAN).

Step S111 preferably includes attempting to establish an internet connection via an Ethernet port of the router or through an open wireless network, but may additionally or alternatively include attempting to establish an internet connection in any suitable manner.

In one embodiment, other configured routers broadcast a restricted open network. The restricted open network is preferably hidden (i.e., it does not broadcast its SSID). Alternatively, the restricted open network may not be hidden. In this embodiment, routers attempting to connect to the internet during configuration may connect to any nearby router's restricted open network. The restricted open network preferably only allows access to cloud servers used for router configuration/registration; additionally or alternatively, the restricted open network may allow any suitable access. For example, the restricted open network may allow communication with Windows update servers as well. The restricted open network preferably allows connections with any device requesting to join; additionally or alternatively, the restricted open network may only allow devices with certain credentials or characteristics to connect. As a first example, the restricted open network may only allow devices with a particular MAC address prefix (e.g., the prefix corresponding to the router manufacturer) to connect. As a second example, the restricted open network may require an access code or cryptographic key, certificate, etc. for a device to connect to the network. As a third example, the restricted open network may only be joined after initiation of out-of-band communication (e.g., the router attempting to join a second router's restricted open network must establish communication with the second router over Bluetooth or another non-WiFi protocol). Devices connecting to the restricted open network are preferably isolated from other devices (e.g., on the main network associated with the router broadcasting the restricted open network) using a virtual LAN. Alternatively, devices joining the restricted open network may have any level of access to devices on the primary network or on other virtual networks (e.g., no access, limited access, full access). In this example, the virtual LAN can enable the routers and servers on the restricted open network to register with a remote management platform, retrieve router configuration updates, and/or download server updates (among other functions) while still enabling network security by barring unwanted connections and traffic on the local area network. In some realizations, the virtual LAN on the restricted open network can also prevent abuse of the restricted open network by restricting bandwidth, limiting the accessible sites that devices on the restricted open network can access, hiding other devices already connected, and/or any other suitable means.

Figure 5A:
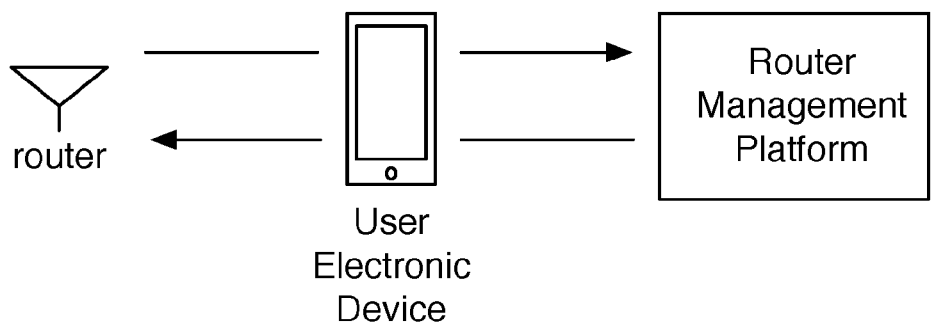
FIGS. 5A and 5B are signal flow representations of configuration data receipt techniques of a method of a preferred embodiment.

If Step S111 is not successful in establishing an internet connection (or for any other reason), Step S111 may include attempting to connect to another device in order to secure an alternative internet connection. In one example, the device can be a smartphone, and Step S111 may include attempting to connect to the internet via the cellular internet connection of the smartphone, as shown in FIG. 5A.

Figure 5B:
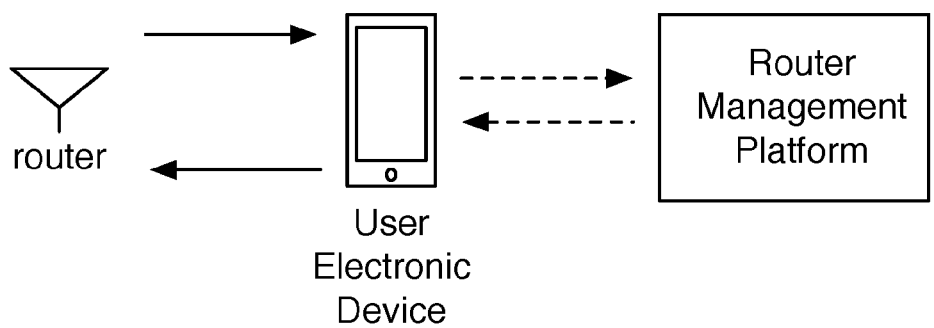

Alternatively, Step S111 may include attempting to connect to a configuration application on another device (e.g., a smartphone) via Bluetooth or Wi-Fi to receive configuration data locally from the device (e.g., the smartphone may download configuration data from the router management platform to the configuration app, and then the router may in turn receive that configuration data from the smartphone), as shown in FIG. 5B. Note that this may be different than the router connecting to the internet via the smartphone, as in this case the router may not necessarily communicate directly with the remote management platform. As a second alternative, Step S111 may include receiving information from a configuration application on another device via push (e.g., over Bluetooth) or via another technique without first attempting a connection.

Step S112, analyzing internet connection paths, functions to determine aspects of network configuration (e.g., the number and priority of accessible internet connections, the existence of a firewall, the existence of NAT or DHCP servers, etc.) from the router's internet connection. Step S112 may include analyzing internet connection paths in a number of ways, some of which are described below.

In one example, Step S112 may include analyzing the router's assigned IP address to determine network configuration details. If, for example, a router is assigned a private IP address (e.g., an IPv4 address of 192.168.1.104) and has internet connectivity, this may indicate that the router is connected to the internet by another router. In contrast, if the router is assigned a public IP address (e.g., an IPv4 address of 8.8.8.8 or an IPv6 address of 2600::aaaa), this may indicate that the router is directly connected to the internet (e.g., via a cable modem or a DSL modem). In some cases, analysis of the router's IP address can enable an estimation of the geographic location of the router, which can be leveraged in determining and/or setting the local area network configuration. In some cases, analysis of the router's IP address can enable estimating the bandwidth or other characteristics of the internet connection (e.g., via a lookup of the ISP providing the IP address). Especially as it relates to those cases in which the local area network includes multiple internet connections, a network bandwidth estimate can aid in distributing traffic share suitably across the various internet connections. In this example, Step S112 may also include analyzing other details related to assigned IP address (e.g., the IP address of the DHCP server that assigned the router's IP address).

In a second example, Step S112 may include communicating with an external server (e.g., through the internet) and analyzing that communication to determine network configuration details. In this example, a router could attempt to communicate with an external server on a number of ports to detect the presence of a firewall. The Internet Assigned Numbers Authority (IANA) maintains a comprehensive database of the different ports and their associated data types; for example, port 25 is reserved for email traffic within the Simple Mail Transfer Protocol (SMTP), while port 80 is designated for world wide web traffic within the Hypertext Transfer Protocol (HTTP). Within the context of this example, a router could attempt to communicate with an external server on a single port, on a predetermined set of ports, on a randomized set of ports, on a set of ports determined from a model, on a set of ports selected for a particular type of traffic, or on a set of ports determined in any other suitable manner. This communication may include a message (or, possibly, multiple messages) which may include a source IP address, a destination IP address, a time stamp, and/or a message body (and/or possibly additional information). In this example, after attempting to communicate to the external server, the router can wait to receive a response from the external server. The external server may not receive a message from the router on a particular port; this may be an indication that traffic has been blocked on that port by a firewall. The external server may receive the message from the router on a particular port and attempt to respond on that same port, but the router may not receive the response message; this may also be an indication that traffic has been blocked on that port by a firewall. The external server may receive the message from the router and respond with a response message, and the router may receive the response message; in this case, the router can analyze aspects of the response message (e.g., time stamp, source IP address, destination IP address, etc.) in order to determine information about firewall presence and/or configuration. For example, if there is a significant time delay between the message initiating from the router and being received at the external server (or, alternatively or additionally, a significant time delay between the response message initiating from the external server and being received at the router), this could be an indication that a firewall has performed a filtering process on transmission of both/either the router's message to the external server and/or the external server's response message to the router. As a second example, if the router attempts to send multiple messages to the external server on a single port and receives responses from only a minor fraction of these messages (where, for example, the minor fraction can be set by a predetermined threshold), this may also be an indication that a firewall is filtering traffic on that port. As a third example, if the router attempts to send multiple messages to the external server on multiple ports and receives responses from the external server on all messages from a first port but only a fraction of messages sent on a second port, this may be an indication that a firewall is filtering traffic on a particular port. As a fourth example, firewalls may also perform NAT, and so, for example, by comparing (e.g., at the router, at the external server, etc.) the source IP address on sending and on receipt and determining that NAT had been performed, one can use this information to help decide if a firewall is present.

In addition to detecting the presence of a firewall, analyzing a communication between a router and an external server on a number of ports may include identifying particular aspects of a firewall if a firewall is present. For example, one firewall type is a stateful firewall, in which the firewall explicitly filters traffic depending on state information of potential traffic (e.g., only passing traffic on permissible ports, with permissible source or destination IP addresses, and/or abiding by any other suitable criteria). In this example, analyzing responses (or null responses) from attempted communications between a router and several external servers may enable determination that a firewall is both present and only transmitting traffic between particular IP addresses (i.e., the firewall is stateful). A second type of firewall, a stateless firewall (in which traffic is passed based solely on IP addresses contained in a packet header), may also be identified by analyzing responses (or null responses) between a router and several external servers.

Figure 6A:
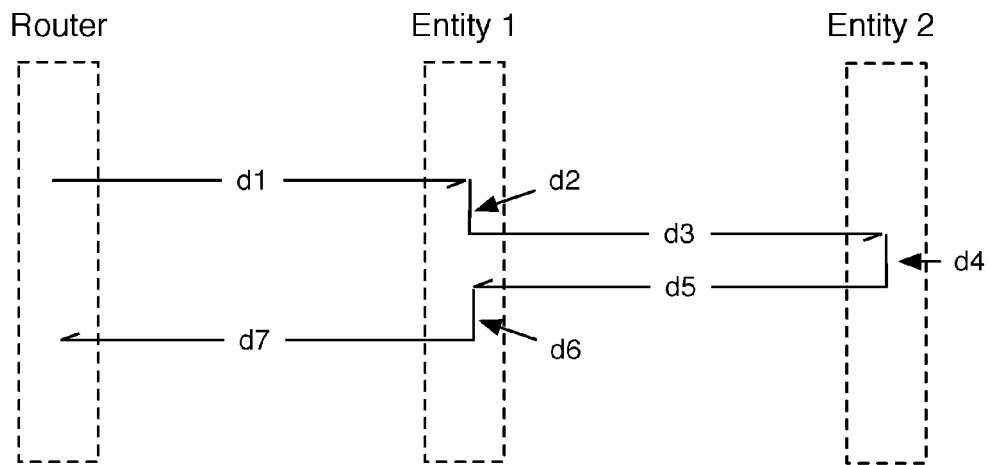
FIGS. 6A and 6B are signal flow representations of signal response delays without and with NAT delays respectively.
Figure 6B:
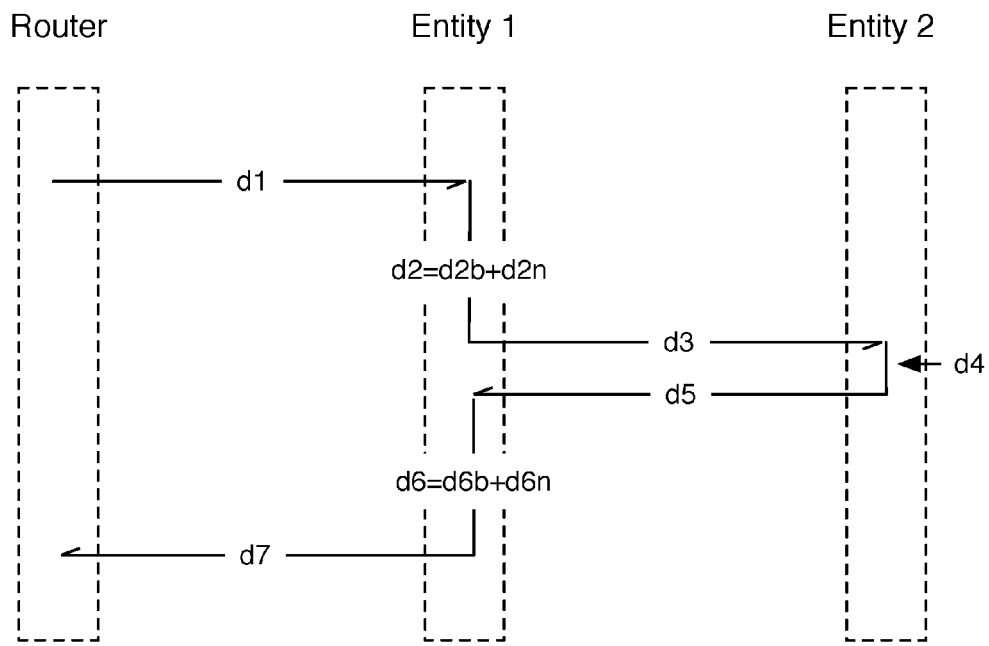

Additionally or alternatively, the router could send messages (e.g., Internet Control Message Protocol (ICMP) echo request packets, User Datagram Protocol (UDP) packets, Transmission Control Protocol Synchronize (TCP SYN) packets, or any other suitable message or packet) with various configurations to determine further connection information. For example, routers typically decrement packet time-to-live (TTL) values when packets pass through; either by manipulating TTL values for packets (e.g., performing a traceroute) or by analyzing TTL values, the number of hops between the router and an external server (and thus some information about network structure) can be determined. Traceroutes in particular can be performed by the router; the IP addresses of responding servers can be used to determine how many hops a packet must take from the router to the internet (identified by the first public IP address responding to the traceroute). Packet response time can also be used to detect the presence of servers or other routers; for instance, network address translation (NAT) may introduce a characteristic delay to packets. In one specific implementation of this example, the router can perform a traceroute test, which includes sending a sequence of packets with a series of integer TTL values to other servers or routers. As the packets hop between network entities, the TTL values are decremented (e.g., by other routers on the local area network, an external server, etc.). When the TTL value of a packet gets decremented to zero, the network entity can discard the packet and return a message to the router performing the traceroute. The returned message to the router can include a packet header, a measurement of the hop round trip time (RTT) of the packets as the packets travel to and from the network entities, the IP addresses of any of the network entities, and/or any other suitable information. In one realization of a traceroute test to detect NAT, the traceroute can be used to measure the RTT of packets and determine NAT presence based on time delays characteristic of NAT. In this example, one can estimate the RTT of packets in the absence of NAT (e.g., by performing traceroute between the router and a network entity for which it is known a priori that no NAT is being performed, and for which the network path between the router and the entity is similar to the network path between the router and the packet's destination) and compare the RTT of packets in the absence of NAT to the RTT as measured by traceroute in the local area network that is to be configured. If the difference between these two RTTs exceeds a NAT threshold time characterized by a time scale for NAT, this can be used to detect the presence of NAT within the local area network. For example, as shown in FIG. 6A, a packet sent between a router and entity 2 (traveling via entity 1) experiences a delay $$d = d_1 + d_2 + d_3 + d_4 + d_5 + d_6 + d_7$$

where $d_1$ is the travel time from the router to entity 1, $d_2$ is the response time of entity 1 (i.e., the time taken to successfully forward the packet), $d_3$ is the travel time from entity 1 to entity 2, $d_4$ is the response time of entity 2 (i.e., the time taken to generate a response to the packet), $d_5$ is the travel time from entity 2 back to entity 1, $d_6$ is the second response time of entity 1, and $d_7$ is the travel time from entity 1 to the router. The example in FIG. 6A assumes that NAT is not performed at entity 1. If NAT is performed at entity 1, as shown in FIG. 6B, the response delays at entity 1 are longer. The response delays may be characterized as a sum of an initial or base delay (e.g., d2b, d6b) and a delay due to NAT (e.g., d2n, d6n).

A time scale for NAT that can be used for the NAT threshold time can be taken directly from a manufacturer's specification; alternatively, a characteristic time delay introduced by NAT can be estimated by comparing the RTT of packets communicated between two servers in which NAT is performed against the RTT of packets communicated between two servers in which NAT is not performed. Any other suitable means for characterizing a time delay associated with NAT can also be used. The NAT threshold time can be a number within the range of 0 to 780,000 milliseconds but alternatively can span any other suitable range.

Figure 7A:
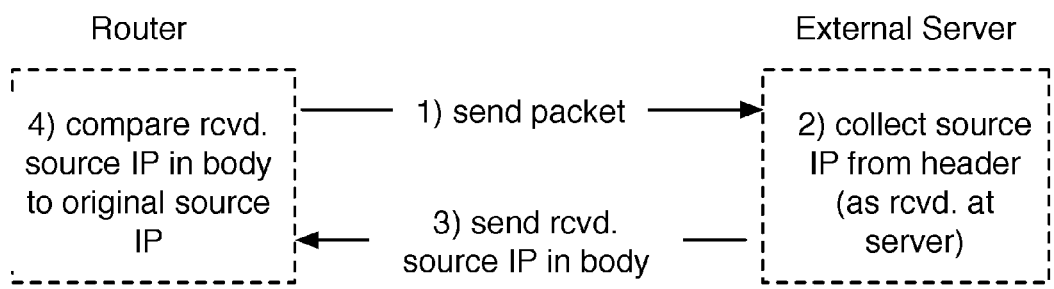
FIGS. 7A and 7B are example representations of NAT detection of a method of a preferred embodiment.
Figure 7B:
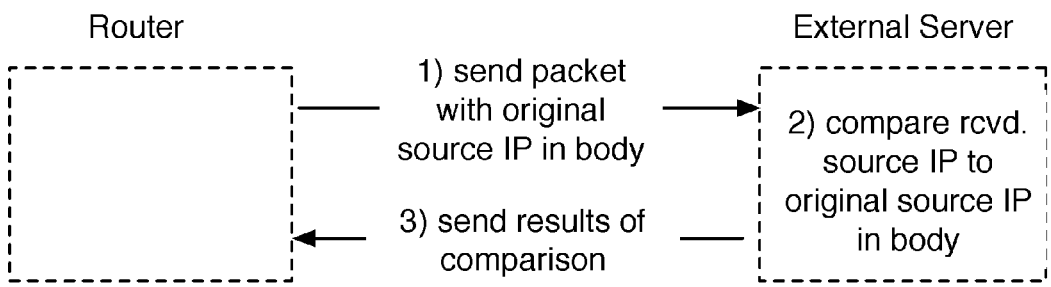

In a second realization of a test to detect NAT, packets can be sent (e.g., the initially sent packets, the intermediate packets, the return packets, etc.) that include information related to IP addresses in the packet headers and/or packet bodies which can be analyzed to determine if NAT is being performed on the local area network. In this example, a particular router can send out packets with an initial source IP address in the packet header and another network entity can collect a particular packet with a first received source IP address, as shown in FIG. 7A. The network entity can then send a response message to the router with the first received source IP address in both the packet header and the packet body, and the router can receive the network entity's response message. The response message that the router receives can contain an IP address in the packet header (containing a second received source IP address) and an IP address in the packet body (containing the first received source IP address). If NAT is being performed on the local area network, the first received source IP address in the packet header may be translated to the second received source IP address on hopping to the router (while the IP address in the packet body may remain fixed), and therefore a detected difference between the received IP addresses in the packet header and packet body may indicate that NAT is being performed. Alternatively, if a router sends a packet identifying its IP address in the body, a receiving server may compare the IP address of the body to the header source IP of the packet containing it (if they are different, this may be indicative of NAT) and return a response to the router (e.g., directly, or indirectly via the router management platform) as shown in FIG. 7B.

Step S112 may include any suitable communication with an external server (or even an internal server) suitable for aiding in analysis of router internet connection paths. In particular, Step S112 may include discovering network translation characteristics of any NAT server present in the router internet connection path. These characteristics may be used to allow the router's NAT server (if operating) to perform translation in a manner compatible with translation performed by other NAT servers. For example, in a mesh network in which a NAT server is already present and in which the router is also intended to be used for NAT, Step S112 may include determining how the pre-existing NAT server performs its network translation (i.e., uncovering the pre-existing NAT server's translation table) and configuring the router to function compatibly with the pre-existing NAT server.

In a third example, Step S112 may include communicating with a remote router management platform. In particular, this is useful for networks including multiple smart routers (described in more detail below). In this example, Step S112 may include comparing router configuration or registration data to detected network configuration data. For example, Step S112 may include scanning ports of the router and comparing results of the port scan to configured firewall values for the router (if, for example, more ports are blocked than expected, this may be indicative of an additional firewall between the router and the remote management platform). Communication with a remote router management platform may include any suitable communication (e.g., a heartbeat signal, a keepalive signal, etc.). Routers may transmit heartbeat signals to provide updates on router status, network status, or any other relevant information to the remote management platform. In some cases, the router can communicate a keepalive signal to the remote management platform. The keepalive signal can be used to ensure that the router and remote management platform maintain their communicative contact, to diagnose a broken link between the router and the remote management platform, to maintain the connection between multiple NAT-enabled routers on the local area network, or for any other suitable purpose. The keepalive signal can be sent after being prompted by a user, at regular time intervals (i.e., every week), when changes to the network configuration are detected, or in any other suitable manner.

While the examples described above may be applicable either to networks containing a single smart router or to networks containing multiple smart routers, Step S112 may additionally be performed in manners specifically designed to leverage the existence of multiple smart routers on a network.

For these additional methods to be performed, detection of multiple smart routers is preferably accomplished by Step S112. The presence of multiple smart routers may be detected in any suitable manner.

Figure 8:
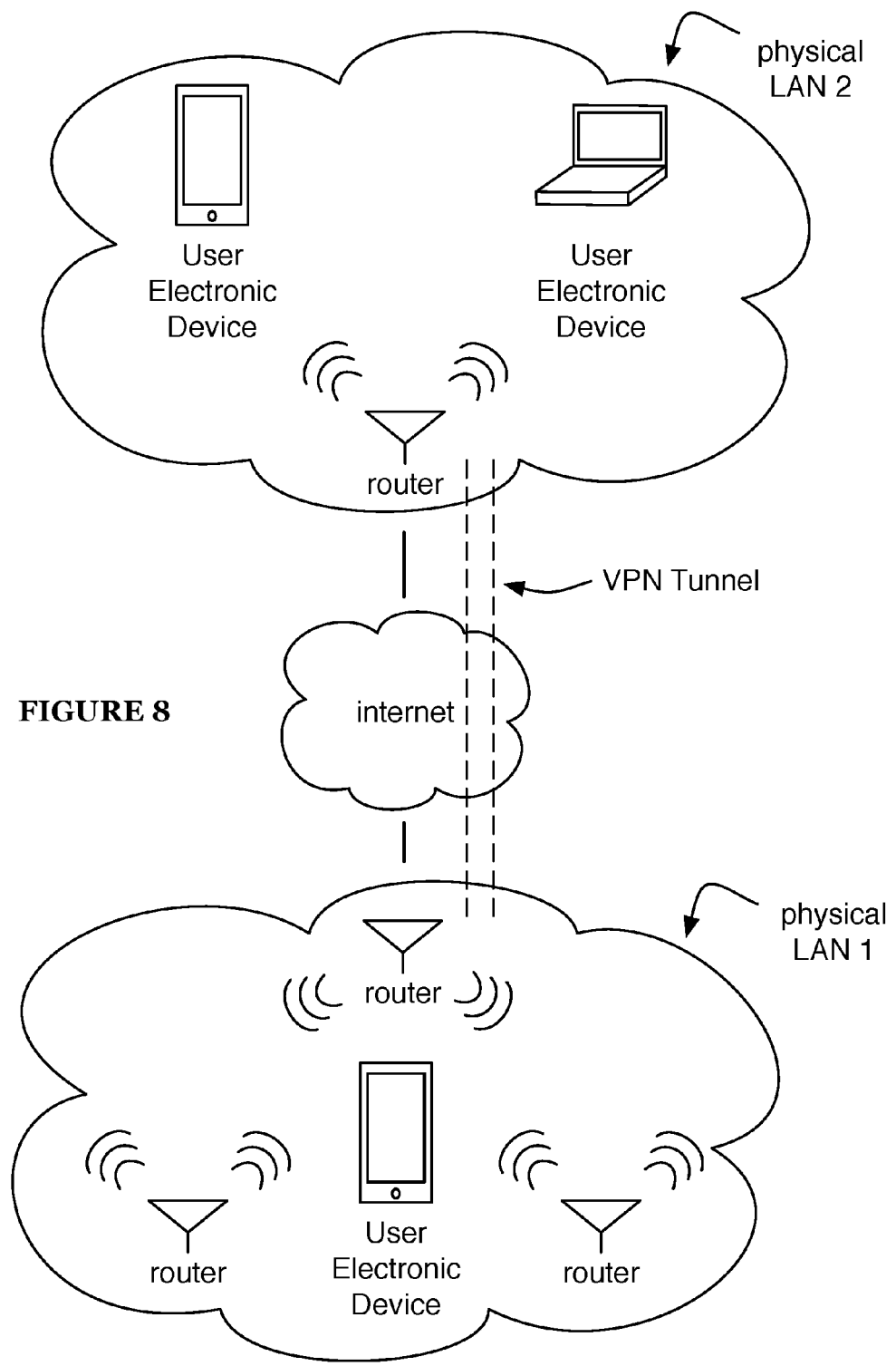
FIG. 8 is a schematic representation of physical LANs linked via VPN tunnel.

In one example, multiple smart routers are detected based on communication with the remote management platform. In this example, a router may download configuration data that includes a reference to additional linked routers (e.g., by MAC address). Here, linked routers preferably refers to routers that are intended to be on the same LAN (noting that this LAN may be include different subnetworks that are also linked virtually, e.g., through VPN as shown in FIG. 8). Alternatively, this reference to linked routers may be programmed into the router prior to communication with the remote management platform (e.g., if this information was included in a set of routers sold together as a mesh network set). Smart routers may additionally or alternatively detect other smart routers in any other suitable manner (e.g., by detecting a hidden access point of another smart router, by detecting a Bluetooth connection of a smart router, by detecting a particular known SSID, etc.). In some cases, detection of other smart routers is inherently linked to a particular network (e.g., when routers are known to be part of a linked mesh network set); in other cases, detection of multiple smart routers may not mean that the routers should operate on the same network or be administered by the same entity. For example, a smart router may detect an open access point of a neighbor's smart router; for the two to be linked in a mesh network, the link would preferably need to be confirmed by both routers (as opposed to in a linked mesh network set, where this link may potentially occur automatically). In some cases, the router can be paired with a router identifier and one or more user accounts stored in the remote management platform, and information about the number of smart routers and their configuration settings (e.g., which, if any, should be DHCP or NAT servers; which, if any, should be linked and isolated on a virtual LAN; details about the topology of the network; etc.) can be associated with the user account and stored at the remote management platform. Users can maintain an account on servers hosted in the cloud and maintained by the router manufacturer or other party; this account can be used to perform registration, to perform router configuration, and/or to access router status information. Router registration data can include an ID number uniquely associated with a particular router (or set of routers) (e.g., a MAC address, a router group identifier) and can additionally include information regarding the local area network configuration associated with the router identifier. In those cases where configuration settings of the local area network are known a priori by associating the router with a router identifier, router configuration data (e.g., DHCP server configuration settings, NAT server configuration settings, wireless access point configuration settings, firewall settings, etc.) can be transmitted from the remote management platform to the router to enable the router to automatically configure suitable configuration settings of the local area network.

Once a set of smart routers are detected and linked together in some way by the remote management platform (or in another suitable manner), Step S112 may include communicating with each of the linked routers in order to analyze internet connection paths. In particular, this is useful when routers are not in direct connection (e.g., the routers are initially not connected by a shared LAN).

For example, a large house can have both a cable modem and a cellular modem. A first router of a linked set is connected to the cable modem, a second router of the linked set is connected to the cellular modem, and the two routers are not otherwise connected. The two routers may be bridged wirelessly so that a user connecting to the wireless network in the house may use either the cellular internet connection or the cable internet connection (this is described in more detail in the sections describing Step S130).

Information for Step S110 may be used not only to identify network device presence and configuration (e.g., presence of a firewall blocking a particular port configuration between a smart router and the internet) but also network device identification. For example, a firewall may be identified as a particular model of firewall based on a default port blocking 'fingerprint' (i.e., how port blocking occurs and for what ports it occurs). As another example, identifying particular client devices can be used to perform quality of service (i.e., assign different priority to different devices and to share LAN and/or internet bandwidth across devices based on priority), to assign particular devices to particular wireless access points or frequencies, or for any other suitable purpose.

Step S120 includes communicating network data with a remote management platform. Step S120 functions to enable data transfer between one or smart routers and a remote management platform. Step S120 preferably functions to provide router configuration data to routers (e.g., DHCP configuration data, firewall configuration data, etc.) and/or aid in detection of network configurations for networks containing smart routers (as described in Step S110). Step S120 may additionally or alternatively function to keep a remote management platform updated on router status (e.g., sending heartbeat signals as previously described). Step S120 may be performed at any time, for any purpose.

Step S130 includes configuring router DHCP and NAT settings. Step S130 functions to configure the smart router to serve as a DHCP server (or client) and/or as a NAT server. Along with NAT configuration, DHCP configuration is particularly important for wireless mesh networks; for example, many mesh network configurations include multiple routers, with only one router configured as a DHCP/NAT server (the rest may essentially serve as wireless access points or repeaters).

Step S130 is preferably performed by altering a stored configuration in a remote management platform and then transmitting that stored configuration to a smart router, but Step S130 may additionally or alternatively be performed locally on the smart router or in any other location. Step S130 is preferably performed by an electronic device linked to the remote management platform (e.g., a smartphone), but may additionally or alternatively be performed by any electronic device (e.g., the router itself, the remote management platform by itself, etc.)

Figure 9:
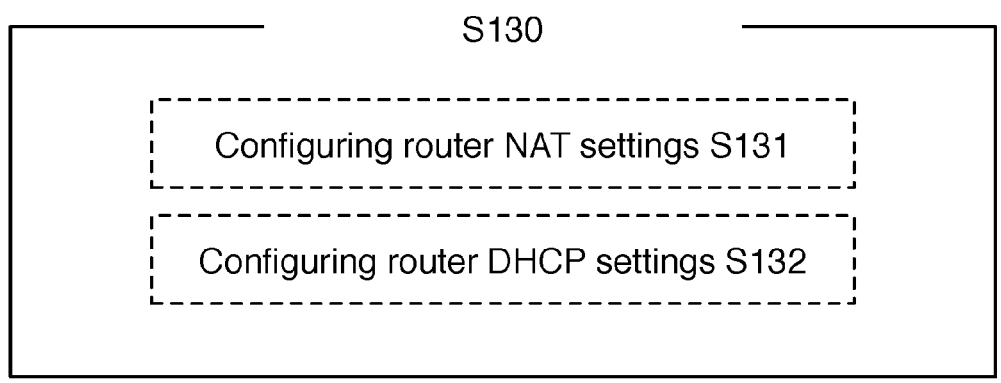
FIG. 9 is a chart representation of NAT/DHCP server configuration step of a method of a preferred embodiment.

Step S130 preferably includes configuring router NAT settings S131, as shown in FIG. 9. Step S131 functions to determine which smart routers on a network (if any) are to serve as NAT servers and to determine configuration details for those NAT servers.

In particular, Step S131 is important in cases where there are multiple potential NAT servers on a network. One common case of this is where a user has existing (non-smart router) networking devices on a network; for example, in situations where a user's cable modem also includes a router (e.g., a wireless access point with DHCP/NAT/firewall). In this case, proper configuration may include disabling NAT in all smart routers on the network (unless additional private networks are desired).

Another common case occurs when a user has multiple smart routers present on a network. In this case, it is important to establish which smart routers (preferably all controlled by a remote management platform) serve as NAT servers.

Step S131 may include configuring NAT servers in a number of ways, including designating a single NAT server (i.e., one router has NAT turned on, the others do not) or by operating multiple NAT servers. If Step S131 includes configuring any dynamic NAT servers, server configurations are preferably controlled by coordinating smart routers through the router management platform; additionally or alternatively, dynamic NAT servers may be managed in any suitable way.

In particular, Step S131 may be used for cases where multiple internet connections are available. For example, Router 1 may be connected to a cable internet connection, while Router 2 may be connected to a cellular internet connection. Step S131 may be used to perform NAT on Router 1 when the cable internet connection is desired, and NAT on Router 2 when the cellular internet connection is desired.

In such cases, Step S131 may include operating a single NAT server that adaptively performs translation (e.g., changing the outside IP to be translated to/from), operating multiple NAT servers simultaneously (e.g., one for a particular subnet, another for a different subnet), and/or operating multiple NAT servers asynchronously (e.g., operating a first NAT server by default, but switching to a second NAT server if the first NAT server experiences a service interruption).

Step S131 may include configuring NAT servers to share traffic in any suitable manner. Traffic sharing preferably includes sharing traffic across multiple internet connections (which correspond to different public IPs used by NAT). For example, Step S131 may include designating primary and secondary (and tertiary, and so on) internet connections, used by all devices on a particular network. Step S131 may additionally or alternatively include designating internet connection by device (e.g., all devices in the 192.168.1.xxx subnet use a particular connection, all smartphones use a particular connection, etc.). Step S131 may additionally or alternatively include designating internet connection by TCP stream (or at any other sub-device resolution level); for example, high bandwidth, latency insensitive applications (e.g., streaming video) may use a first connection, while low bandwidth, latency sensitive applications (e.g., real-time online gaming) may use a second connection.

Step S131 may include sharing traffic based on any suitable input data. For example, Step S131 may include altering NAT configuration based on available bandwidth (e.g., a particular connection is only used until a bandwidth cap is reached), price (e.g., expensive connections may be used only when necessary for a particular application), or any other criteria. Traffic sharing agreements are preferably determined by the router management platform, but may additionally or alternatively be determined by any suitable entity.

Traffic sharing can also be accomplished via network load balancing algorithms, whereby IP traffic is distributed over the multiple internet connections in order to meet one or more network goals. Examples of network goals may include reducing response time for one or more devices on the network, increasing bandwidth available to one or more devices on the network, increasing performance for particular services or types of traffic on the network, increasing reliability of internet access for devices on the network, etc. A first example of a network load balancing algorithm for traffic sharing is a round robin algorithm. The round robin algorithm allocates a first IP traffic request to a randomly selected first internet connection, a second traffic request to a second internet connection that is randomly selected except that it excludes the first, and so on until all internet connections have been allocated at least once, at which point the cycle repeats. Round robin works well when most traffic requests are roughly equal in bandwidth demand and duration. A second example of a network load balancing algorithm is dynamic round robin. Dynamic round robin works similarly to the base round robin algorithm except that the allocation step is distributed according to a weighting scheme discerned from real-time internet connection performance. Dynamic round robin can eschew the problem of multiple high traffic requests being routed over the same internet connection. A third example of a network load balancing algorithm is a predictive algorithm. A predictive algorithm can monitor real-time internet connection characteristics (e.g., which internet connections have the fewest IP traffic requests on them, which internet connections have the largest data stream allocations on them, etc.) and historical internet connection characteristics (e.g., a time series of monitored download and upload speeds over a recent time period) in order to determine which internet connections are improving or declining in performance over time (as quantified in a metric of performance), can feed these metrics of performance into a dynamic weighting scheme, and can allocate new IP traffic requests according to the dynamic weighting scheme. Alternatively, any suitable network load balancing algorithm can be implemented.

Instead of or in addition to sharing traffic over multiple internet connections, traffic can also be shared over multiple smart routers. Load balancing, traffic sharing agreements, or any other suitable means for determining how traffic is shared across the different routers can be implemented to accomplish similar network goals as for traffic sharing over multiple internet connections (e.g., increased network bandwidth, speed, reliability, performance, etc.).

The manner in which the network performs load balancing can be predetermined (e.g., traffic can be proportionally distributed across internet connections), dynamically determined (e.g., at the time of a user request, the particular request can assign a priority, and then the routers can handle load performance in accordance with the priority hierarchy of all network traffic), or determined in any other suitable manner.

Step S130 preferably includes configuring router DHCP settings S132, as shown in FIG. 9. Step S132 functions to determine which smart routers on a network (if any) are to serve as DHCP servers and to determine configuration details for those DHCP servers.

In particular, Step S132 is important in cases where there are multiple potential DHCP servers on a network. One common case of this is where a user has existing (non-smart router) networking devices on a network; for example, in situations where a user's cable modem also includes a router (e.g., a wireless access point with DHCP/NAT/firewall). In this case, proper configuration may include disabling DHCP in all smart routers on the network (unless additional private networks are desired).

Another common case occurs when a user has multiple smart routers present on a network. In this case, it is important to establish which smart routers (preferably all controlled by a remote management platform) serve as DHCP servers.

Step S132 may include configuring DHCP servers in a number of ways, including designating a single DHCP server (i.e., one router has DHCP turned on, the others do not) or by operating multiple DHCP servers. If Step S132 includes configuring any dynamic DHCP servers, server configurations are preferably controlled by coordinating smart routers through the router management platform; additionally or alternatively, dynamic DHCP servers may be managed in any suitable way.

If Step S132 includes operating multiple DHCP servers, the DHCP servers preferably share an IP table (e.g., DHCP servers assign IP addresses to devices and the assignments are stored in a table accessible to the multiple servers so that they do not attempt to assign different IP addresses to the same device).

Additionally or alternatively, Step S132 may include configuring DHCP servers to share IP assignment in any suitable manner. For example, Step S132 may include designating primary and secondary (and tertiary, and so on) DHCP servers, used by all devices on a particular network. Step S132 may additionally or alternatively include designating DHCP server by device (e.g., all devices with one MAC address range use a particular DHCP server) or by desired subnet (preferably configured by the remote management platform). Step S132 may include sharing IP assignment duties based on any suitable input data.

Step S140 includes configuring router firewall settings. Step S140 functions to determine which smart routers on a network (if any) are to serve as firewalls and to determine configuration details for those firewalls.

In particular, Step S140 is important in cases where there are multiple potential firewalls (software OR hardware) on a network. One common case of this is where a user has existing (non-smart router) networking devices on a network; for example, in situations where a user's cable modem also includes a router (e.g., a wireless access point with DHCP/NAT/firewall). In this case, proper configuration may include disabling firewalls in all smart routers on the network (unless additional protection is desired).

Another common case occurs when a user has multiple smart routers present on a network. In this case, it is important to establish which smart routers (preferably all controlled by a remote management platform) serve as firewalls.

In general, Step S140 preferably includes operating firewalls on any router performing NAT but may additionally or alternatively include operating firewalls (or not) on any smart router.

Step S140 preferably includes configuring firewalls based on configuration data stored in the remote management platform but may additionally or alternatively configure firewalls in any suitable manner.

Step S150 includes prompting user intervention. Step S150 functions to enable users to reconfigure devices on the network not controlled by the remote management platform (e.g., non-smart-router networking devices or smart routers inaccessible to the remote management platform). For example, Step S150 may include providing a user instructions to reconfigure a modem with an integrated router to disable NAT, DHCP, and firewall, allowing a smart router to take over these functions.

Figure 10A:
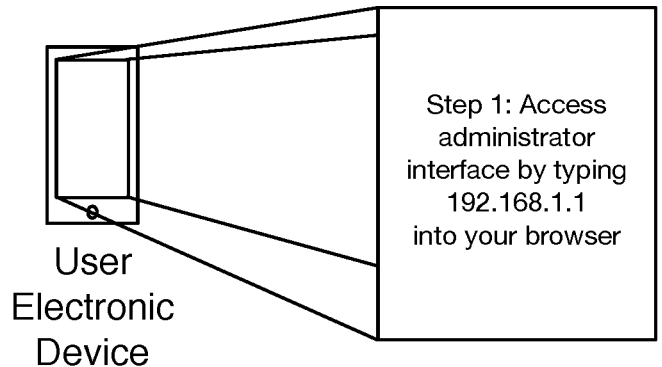
FIGS. 10A and 10B are example representations of user intervention of a method of a preferred embodiment.

Step S150 preferably includes instructing a user to perform network configuration in any suitable way (including providing instructions for changing network device configurations in software, rerouting Ethernet cables, moving wireless access points, etc.), as shown in FIG. 10A. In one example, the user wants to modify network configuration settings (including DHCP servers, NAT servers, wireless access points, firewalls, etc.) after the previous steps have been performed. Step S150 enables the user (most preferably by means of software operating in conjunction with a remote management platform, but alternatively otherwise) to easily implement the desired configuration changes. In a second example, the user can confirm that the network configuration performed by the earlier steps are appropriate. In this second example, the user is given instructions through software on an external electronic device; per the instructions, the user can then reconfigure network configuration settings when the reconfiguration includes physical modifications to network features (e.g., disconnecting routers which were previously physically tethered by an Ethernet cable).

Figure 10B:
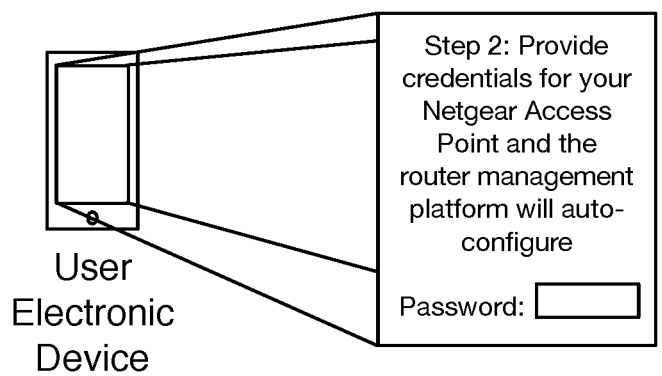

In a variation of a preferred embodiment, Step S150 performs some or all of reconfiguration of other devices desired. For example, software on a smart router (or in the remote management platform, if the web interface is accessible to the platform) may automatically perform the reconfiguration desired, as shown in FIG. 10B. For example, Step S150 may include requesting a user identifier (e.g., credential, account name, password, access code, etc.) and network entity identifiers (e.g., identifying the other devices as routers, servers, etc.; identifying the manufacturers or model numbers of the other devices; etc.) in the process of reconfiguration. In this example, Step S150 may include the user providing the network entity identifiers (e.g., via a user interface on a user electronic device, through a web interface accessible to the remote management platform, etc.) and/or the network entity identifiers being detecting automatically.

As one of ordinary skill in the art will recognize, suitable combinations of the method steps can be readily envisioned and performed in a diverse range of contexts. In a first example, a method for router configuration can include collecting DHCP server presence data of a local area network at a router; collecting NAT server presence data of the local area network at the router; generating a network configuration status based upon the DHCP server presence data and the NAT server presence data; and configuring DHCP server and NAT server settings of the router based on the network configuration status. This example can additionally include detecting and configuring firewall settings of the local area network; detecting and configuring wireless access points of the local area network; designating a hierarchy of internet connections (e.g., primary and secondary internet connections) during the configuration of the NAT server settings; and/or storing the network configuration status at a remote management platform. In this example, the router can detect the local area network configuration and topology, which may already include, for example, other routers, NAT servers, or DHCP servers, each of which may be connected to each other in a variety of ways). Further, in this example, the router can identify the other entities (e.g., DHCP servers, NAT servers, firewalls, wireless access points, smart routers, non-smart routers, etc.) on the local area network and suitably configure itself based on presence and/or configuration of the entities on the local area network, all automatically and without requiring prior knowledge of the constituent elements contained in the local area network. This example can be especially useful for mesh network configuration, where the router management platform can facilitate the automatic detection of the various entities in the local area network and configure one or more entities to work in tandem (e.g., one router as a gateway and other routers serving as wireless repeaters or wireless access points). This example can also enable anyone authorized to access the remote management platform to aid in configuring the router (e.g., when the user is having trouble configuring the local area network) via a secondary internet connection (e.g., tethered cellular internet connection), even when the router's primary internet connection (e.g., a cable modem) is down.

In a second example, a method for router configuration includes establishing an internet connection at a router; transmitting a router identifier of the router to a remote management platform via the internet connection; at the remote management platform, identifying a local area network configuration (including DHCP server configuration settings, NAT server configuration settings, firewall settings, and wireless access point configuration settings) associated with the router identifier; transmitting the local area network configuration from the remote management platform to the router; and at the router, configuring the DHCP server configuration settings, NAT server configuration settings, firewall settings, and wireless access point configuration settings based on the local area network configuration. This example can additionally include connecting to a user mobile electronic device and receiving the local area network configuration from the user mobile electronic device; connecting to a cellular internet connection of the user mobile electronic device to request the local area network configuration from the remote management platform; and/or updating the local area network configuration with a user device. In this example, the router can identify a local area network configuration by retrieving the configuration data from the remote management platform over the internet and can automatically configure the local area network entities (e.g., DHCP servers, NAT servers, firewalls, wireless access points, smart routers, non-smart routers, etc.) based upon the configuration data retrieved from the remote management platform. In this example, the router can specifically leverage additional, a priori knowledge of the local area network configuration and topology in order to configure all local area network entities to work in tandem. This example realizes many of the benefits of the first example but can eschew explicitly detecting the local area network configuration, which may expedite the process for automatic configuration.

The methods of the preferred embodiment and variations thereof can be embodied and/or implemented at least in part as a machine configured to receive a computer-readable medium storing computer-readable instructions. The instructions are preferably executed by computer-executable components preferably integrated with a smart router. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for router configuration, the method comprising:
   at a router, collecting dynamic host configuration protocol (DHCP) server presence data of a local area network;
   at the router, collecting network address translation (NAT) server presence data of the local area network, the NAT server presence data indicating a presence of a NAT server on the local area network;
   collecting firewall presence data of the local area network, comprising:
      establishing communication between an external server and the router; and
      determining the firewall presence data based on analysis of the communication between the external server and the router, comprising: generating a port blocking fingerprint; and attempting to characterize a firewall presence between the router and the external server based upon the port blocking fingerprint;
   generating a network configuration status based upon the DHCP server presence data, the NAT server presence data, and the firewall presence data; and
   configuring DHCP server and NAT server settings of the router based on the network configuration status, comprising configuring the router to not operate as a NAT server.

2. The method of claim 1, further comprising configuring firewall settings of the router based on the network configuration status.

3. The method of claim 1, wherein collecting firewall presence data of the local area network further comprises:
   sending a message to the external server external the local area network; and
   at the external server, establishing the communication between the external server and the router.

4. The method of claim 1, further comprising collecting wireless access point data of the local area network; wherein generating the network configuration status further comprises generating the network configuration status based upon the wireless access point data; the method further comprising configuring wireless access point settings of the router based on the network configuration status.

5. The method of claim 4, wherein collecting wireless access point data of the local area network comprises determining a service set identifier (SSID) associated with the local area network and measuring a signal strength, a signal channel, and a signal frequency of a wireless access point of the local area network.

6. The method of claim 1, wherein collecting DHCP server presence data comprises collecting an internet protocol (IP) address assigned to the router; wherein generating the network configuration status comprises generating the network configuration status based on an analysis of the IP address.

7. The method of claim 6, wherein collecting the IP address assigned to the router comprises detecting that the IP address possesses a private designation; wherein generating the network configuration status based on the analysis of the IP address comprises detecting a presence of a DHCP server on the local area network and external to the router based on the IP address possessing the private designation.

8. The method of claim 1, wherein collecting NAT server presence data comprises performing a traceroute to a second external server external the local area network; wherein generating the network configuration status comprises generating the network configuration status based on an analysis of the traceroute to the second external server.

9. The method of claim 8, wherein performing the traceroute to the second external server comprises sending a packet from the router to the external server; wherein generating the network configuration status based on the analysis of the traceroute to the second external server comprises analyzing a round trip time of the packet to determine if the round trip time includes a characteristic time delay indicative of network address translation.

10. The method of claim 1, wherein collecting NAT server presence data comprises sending a packet having a packet header, the packet header containing an initial source internet protocol (IP) address, from the router to a second external server external the local area network; and, at the second external server, collecting a translated source IP address from the packet header; wherein generating the network configuration status comprises identifying a NAT server presence based on a difference of the initial source IP address and the translated source IP address.

11. The method of claim 1, wherein collecting NAT server presence data comprises sending a packet having both a packet header and a packet body to a second external server external the local area network; wherein both of the packet header and the packet body contain an initial source internet protocol (IP) address; and, at the second external server collecting a translated source IP address from the packet header; wherein generating the network configuration status comprises identifying, at the second external server, a difference of the initial source IP address contained within the packet body and the translated source IP address.

12. The method of claim 1, further comprising detecting first and second internet connections accessible to the router and configuring the NAT server settings of the router to perform network address translation for both of the first and second internet connections.

13. The method of claim 12, wherein configuring the NAT server settings of the router comprises designating the first internet connection as a primary internet connection, designating the second internet connection as a secondary internet connection, and determining a condition for switching network traffic between the primary internet connection and the secondary internet connection.

14. The method of claim 1, further comprising transmitting the network configuration status and a router identifier to a remote management platform, storing the network configuration status at the remote management platform, and associating the network configuration status with a user account at the remote management platform based on the router identifier.

15. The method of claim 8, wherein the external server comprises the second external server.

16. The method of claim 1, wherein:
the DHCP server presence data indicates a presence of a DHCP server on the local area network; and
configuring DHCP server and NAT server settings of the router further comprises configuring the router to not operate as a DHCP server.

* * * * *